(12) United States Patent
Bergner et al.

(10) Patent No.: US 11,717,092 B2
(45) Date of Patent: Aug. 8, 2023

(54) SPRING CORE

(71) Applicant: IKEA Supply AG, Pratteln (CH)

(72) Inventors: Anders Bergner, Halmstad (SE); Zhiming Tan, Guangzhou (CN)

(73) Assignee: IKEA SUPPLY AG, Pratteln (CH)

( * ) Notice: Subject to any disclaimer, the term of this patent is extended or adjusted under 35 U.S.C. 154(b) by 0 days.

(21) Appl. No.: 17/714,809

(22) Filed: Apr. 6, 2022

(65) Prior Publication Data

US 2022/0225784 A1 Jul. 21, 2022

Related U.S. Application Data

(63) Continuation of application No. 16/761,607, filed as application No. PCT/EP2018/080460 on Nov. 7, 2018, now Pat. No. 11,324,333.

(30) Foreign Application Priority Data

Nov. 9, 2017 (CN) .......................... 201711097375.4
Dec. 21, 2017 (SE) .................................... 1751600-6

(51) Int. Cl.
*A47C 23/043* (2006.01)
*F16F 3/04* (2006.01)

(52) U.S. Cl.
CPC .............. *A47C 23/043* (2013.01); *F16F 3/04* (2013.01); *F16F 2226/04* (2013.01); *F16F 2236/045* (2013.01)

(58) Field of Classification Search
CPC ........ A47C 23/043; A47C 27/064; F16F 3/04; F16F 2226/04; F16F 2236/045
See application file for complete search history.

(56) References Cited

U.S. PATENT DOCUMENTS 465,024 A * 12/1891 Kraber .................. A47C 23/18
5/190
1,465,766 A 8/1923 Krakauer
(Continued)

FOREIGN PATENT DOCUMENTS

AU 551300 9/1983
CN 102894722 A 1/2013
(Continued)

OTHER PUBLICATIONS

International Search Report for International Application No. PCT/EP2018/080460 dated Jan. 16, 2019 (2 pages).
(Continued)

*Primary Examiner* — Melanie Torres Williams
(74) *Attorney, Agent, or Firm* — Merchant & Gould P.C.

(57) ABSTRACT

The present invention concerns a spring core (1, 1a, 12, 13, 17, 18) that may be used in e.g. bed mattresses, chairs or sofas. The spring core (1, 1a, 12, 13, 17, 18) comprises springs placed inside pocket (3). The pockets (3) are placed in a number of rows, which rows of pockets (3) are placed side by side. The spring core (1, 1a, 12, 13, 17, 18) is held in a compressed state by means of at least one cord (5). The at least one cord (5) is formed into braids (6) at opposite outer ends (7) of each row of pockets (3). Further, the at least one cord (4) forms a number of loops (8) on at least one side of each row of pockets (3). By pulling at one free end (10) of the at least one cord (5) the braids (6) and loops (8) are dissolved, allowing the spring core (1) to return to the non-compressed state.

19 Claims, 6 Drawing Sheets

(56) References Cited

U.S. PATENT DOCUMENTS

| | | | | |
|---|---|---|---|---|
| 2,812,014 | A | * | 11/1957 | Hammond ............... A47C 7/30 5/721 |
| 2,842,784 | A | | 7/1959 | Grund |
| 2,970,979 | A | | 2/1961 | Kramer |
| 3,080,578 | A | | 3/1963 | Novascone |
| 3,386,113 | A | * | 6/1968 | Kramer ................. A47C 23/14 5/190 |
| 4,381,570 | A | * | 5/1983 | Schneider .............. A47C 17/22 5/13 |
| 6,088,857 | A | | 7/2000 | Ogle |
| 6,347,423 | B1 | | 2/2002 | Stumpf |
| 2004/0211225 | A1 | | 10/2004 | Dickerson |
| 2005/0052068 | A1 | | 3/2005 | Smith et al. |
| 2007/0094807 | A1 | * | 5/2007 | Wells ................... A47C 27/065 5/248 |
| 2011/0148018 | A1 | * | 6/2011 | DeFranks .......... A47C 23/0438 267/166.1 |
| 2014/0373282 | A1 | | 12/2014 | Mossbeck et al. |

FOREIGN PATENT DOCUMENTS

| | | | | | |
|---|---|---|---|---|---|
| CN | 103431682 | A | | 12/2013 | |
| CN | 203913440 | U | | 11/2014 | |
| CN | 206284409 | U | | 6/2017 | |
| CN | 107232869 | | | 10/2017 | |
| CN | 107692645 | A | | 2/2018 | |
| CN | 105358012 | B | * | 7/2018 | ......... A47C 23/0435 |
| ES | 1066209 | U | | 12/2007 | |
| FR | 2325340 | A | * | 5/1977 | ........... A47C 31/105 |
| FR | 2551098 | A1 | * | 3/1985 | |
| GB | 2427415 | A | | 12/2006 | |
| JP | 2005065727 | A | | 3/2005 | |
| WO | 2007/063276 | A1 | | 6/2007 | |
| WO | 2016/195700 | A1 | | 12/2016 | |
| WO | 2019/092010 | A1 | | 5/2019 | |

OTHER PUBLICATIONS

Swedish Office Action for Swedish Application No. 1751600-6 dated May 30, 2018 (9 pages).

U.S. Pat. No. 283,616 issued Aug. 21, 1883, "Spring Pillow", R. Kershner.

U.S. Pat. No. 391,300 issued Oct. 16, 1888, "Pillow", JR Cluxton.

Chinese Office Action for CN Application No. 201880072023.X dated Dec. 13, 2021 (19 pages, with English translation).

* cited by examiner

SPRING CORE

CROSS-REFERENCE TO RELATED APPLICATIONS

This application is a continuation of U.S. application Ser. No. 16/761,607, filed 5 May 2020, which is a U.S. National Stage Application of PCT/EP2018/080460, filed 7 Nov. 2018, which claims benefit of Serial No. 201711097375.4, filed 9 Nov. 2017 in China and Serial No. 1751600-6, filed 21 Dec. 2107 in Sweden and which applications are incorporated herein by reference. To the extent appropriate, a claim of priority is made to each of the above disclosed applications.

TECHNICAL FIELD

The present invention concerns spring cores. More specifically the invention concerns means to keep the spring core in a compressed condition and to bring it to a fully developed condition.

PRIOR ART

Different types of spring cores are known for use in bed mattresses, sofas or chairs. A spring core may have a number of springs placed in pockets. The pockets are often made of a strip of non-woven material which may be a textile or polypropylene non-woven material. The springs are inserted into a long piece of the non-woven material, which is welded shut between the springs, forming the pockets. A number of pockets form a spring strip together, which spring string has the same length as the desired length of the spring core. Thus, each spring string is formed of a row of pockets. The number of spring strings placed side by side depend on the desired width of the spring core.

Each spring string may comprise one or more layers of springs placed on top of each other. It is common to have one, two or three such layers of springs.

In the process of production and circulation of entire mattresses the cost of storage and logistics are relatively high, due to their large volumes. For transportation and storing, it is common to compress the springs of a spring core. One previously known method for compressing the springs is vacuum packaging, whereby a mattress is first put into a plastic sack and compressed. The plastic sack is then vacuumized and sealed. The mattress may then be kept in a rolled-up way. However, this method is costly and there is a risk that the plastic sack may break, leak air and expand, and the outside material of the finished mattress after being compressed, rolled-up and packed for a long time may therefore be damaged. It also requires additional packaging material, which will take up space.

SUMMARY

To facilitate transportation and storing, it is a general wish to reduce the volume of different parts, such as spring cores. In order to reduce the required space needed during transport and in storing, the spring core is often kept in a compressed condition. In the compressed condition of the spring core, the springs of the core are compressed. In time of use of the spring core, it should be easy to bring the spring core into a non-compressed condition.

According to one aspect of the present invention, a spring core is provided comprising springs placed inside pockets. The pockets are placed in a number of rows, which rows are placed side by side. The spring core is held in a compressed state by means of at least one cord or thread. The at least one cord is made to form braids at opposite outer ends of each row of pockets. The at least one cord passes through holes in the pockets in such a way that the at least one cord forms a number of interconnected loops on at least one side of each row of pockets.

By pulling the cord, the compressed condition of the spring core is loosened and the springs of the pockets will return to a non-compressed state one after the other.

The present invention does not require use of a plastic sack, which reduces costs, is environmental friendliness and utilizes simple and convenient sewing. Moreover, the compression way of the invention is independent of vacuumizing, so that the method is more suitable for long-term storage of mattresses. Furthermore, a compressed pocket spring mattresses can be packaged in a folded way besides in a rolled-up way, whereby the pocket spring mattresses are more convenient to transport and the circulation cost is lowered.

Further objects and advantages of the present invention will be obvious to a person skilled in the art when reading the detailed description below of different embodiments.

BRIEF DESCRIPTION OF THE DRAWINGS

The present invention will be described further below by way of example and with reference to the enclosed drawings. In the drawings.

DETAILED DESCRIPTION OF EMBODIMENTS

Figure 1:
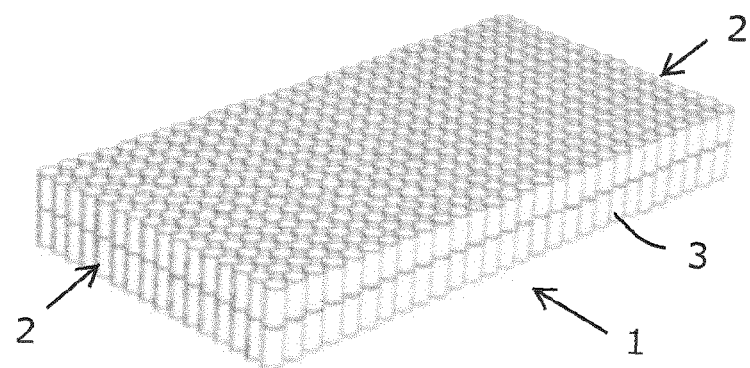
FIG. 1 is a perspective view of one embodiment of a spring core.

In FIG. 1 one example of a spring core 1 is shown. The spring core comprises a number of spring strings 2 placed interconnected side by side. Each spring string 2 comprises a number of pockets 3, inside of which one or more springs are placed. Thus, each spring string 2 forms a row of pockets 3 in the spring core 1 as formed. In the embodiment of FIG.

Figure 2:
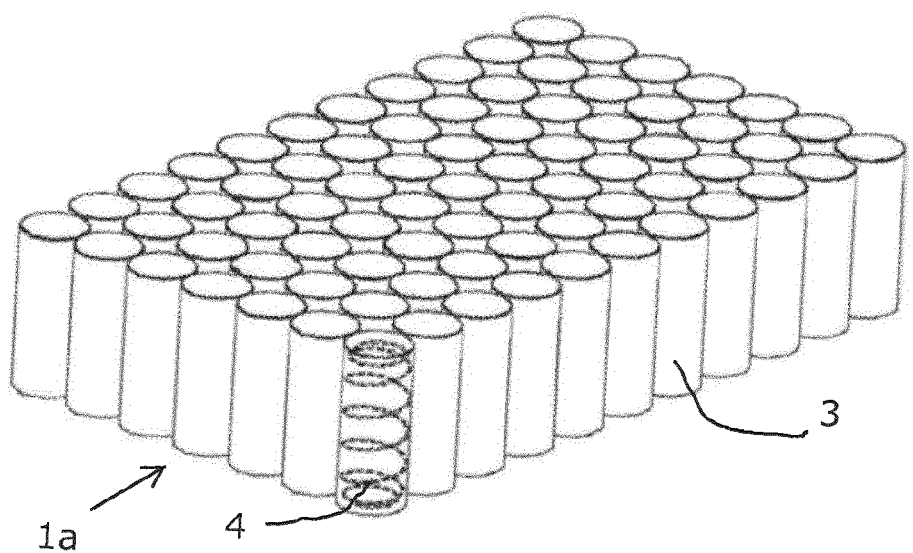
FIG. 2 is a perspective view of a further embodiment of a spring core, partly broken away.

1 there are two layers of pockets, with one spring placed inside each pocket 3. A person skilled in the art realises that spring cores 1 may be used in e.g. mattresses, chairs or sofas. In FIG. 2 a spring core 1a having one layer of pockets 3 is shown. In one pocket 3 a spring 4 is indicated.

Figure 3:
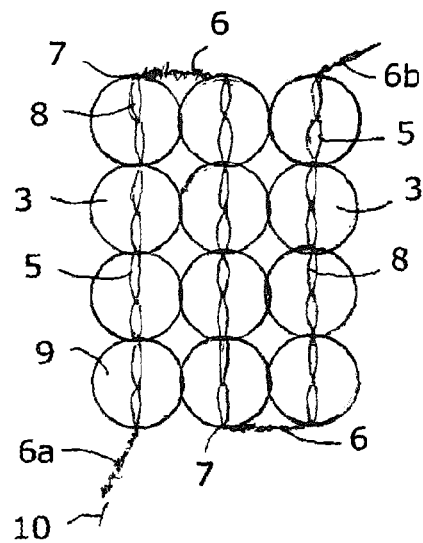
FIG. 3 is a sketch in plan view illustrating one aspect of the invention.

The sketch of FIG. 3 is only for illustrative purpose and some parts are shown exaggerated. In the sketch of FIG. 3, only three rows of pockets 3 are shown. A person skilled in the art realises that a spring core normally has a much larger number of rows of pockets.

In order to reduce the volume of the spring core 1, for transportation and storing, it is compressed and is kept in the compressed condition by means of a single thread or cord 5. The single cord 5 is used to form a braid-like part, named braid 6 below, at opposite outer ends 7 of each row of pockets. A braid 6 goes between adjacent outer ends 7 of the rows of pockets 3. Between the braids 6 the cord 5 forms a number of interconnected loops 8 on one side of the row of pockets 3. On the opposite side of the row of pockets 3 the cord 5 is single. To form a loop 8 the cord 5 goes up through an opening in a pocket 3, goes through a previously formed loop 8 and back down through the same opening. The cord 5 then goes to and up through an adjacent opening in the pocket 3, and then through the just formed loop 8 and back down to said adjacent opening and so on. In the shown sketch there are two loops 8 at each pocket 3. In other embodiments there are other numbers of loops 8 at each pocket, for instance one, three or four loops 8 at each pocket 3. The size of respective loop 8 in FIG. 3 is exaggerated. In practice the parts of the cord 5 forming the loops 8 are held tight between the braids 6 at opposite ends of each row of pockets 3.

A first braid 6a is formed at one corner pocket 9, with a free end 10 of the cord 5 going out from said first braid 6a, at the corner pocket 9. The cord 5 goes from the first braid 6a at said corner pocket 9 in a first end row of pockets 3 up and down holes formed in the pockets 3, forming loops 8 as indicated above. At the opposite end of the first end row of pockets 3 the cord 5, in the form of a braid 6, goes over to the adjacent row of pockets 3. In said adjacent row of pockets 3 the cord 5 goes up and down holes formed in the pockets 3, forming loops 8. At the other end of the row of pockets 3 the cord 5 goes over, in the form of a braid 6, to the next adjacent row of pockets 3. The cord 5 continues in the same manner until it reaches the last pocket 3 of the last row of pockets 3, whereby the cord 5 is formed into a last braid 6b at the outer end 7 of said last pocket 3 of said last row of pockets 3.

Normally means, such as a piece of tape, is attached to the free end 10 of the cord 5 and the first braid 6a at the corner pocket 9 in such a way that unintentional pulling of said free end 10 is prevented. When the spring core 1 is to be returned to the non-compressed state, the piece of tape is removed and the free end 10 of the cord 5 is pulled.

By the co-operation of the braids 6 and the loops 8 of the cord 5, the spring cord 1 is kept in a compressed state.

In one example the braids 6 and loops 8 are formed by means of chain stitches. In the braids 6 the chain stitches are small and placed close to each other, while the chain stitches forming the loops 8 are bigger. The braids 6 and the loops 8 may be formed in the style of crocheting.

As is known, a braid 6 formed of chain stiches can be dissolved by pulling a free end of the cord 5 of which the braid 6 is formed. The same applies for the chain stitches forming the loops 8. This is used according to the present invention to bring the spring core 1 to a not compressed state. By pulling the free end 10 of the cord 5 the first braid 6a at said free end 9 is dissolved. By continue to pull the cord 5 the loops 8 up to the braid 6 on the opposite side are dissolved. Thereby the springs 4 of that row of pockets 3 no longer are exposed to any compressing force, whereby the springs 4 will flex back or return to the non-compressed state. By continuing to pull at the cord 5, the other braids 6 and loops 8 are dissolved, whereby all springs 4 gradually return to the non-compressed state and the spring cord 1 assumes the desired thickness. The single cord 5 may be reused or discarded. The cord 5 is formed in such a way that the braids 6 and loops 8 will not be dissolved by pulling at the end of the cord 5 opposite said free end 10 of the cord 5.

Figure 4:
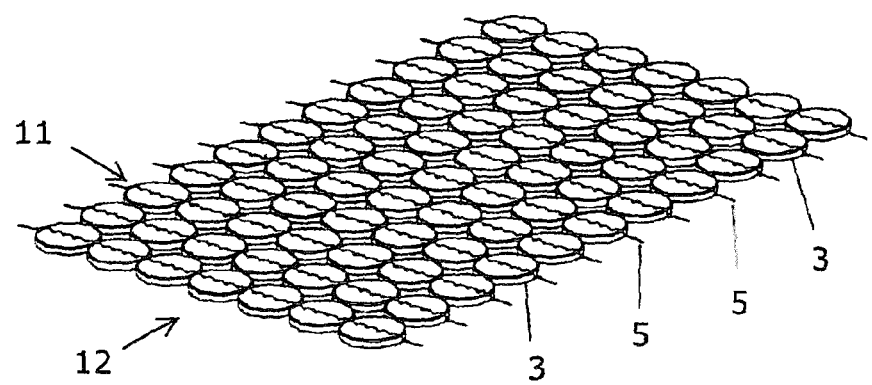
FIG. 4 is a schematic, perspective view of one embodiment of the present invention.
Figure 5:
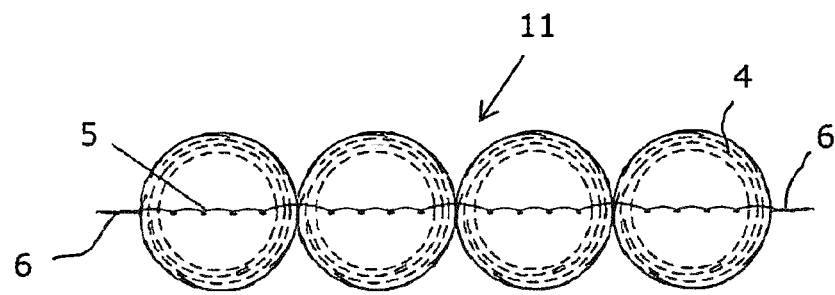
FIG. 5 is a plan view of a part of the embodiment of FIG. 4.
Figure 6:
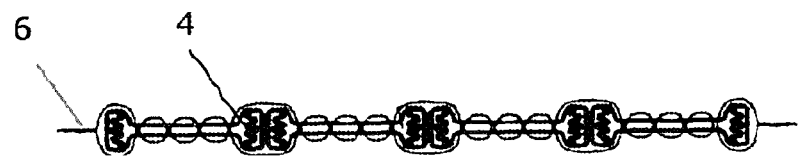
FIG. 6 is a sectional view of the part of FIG. 5.

In the embodiment shown in FIG. 4 each spring string 11 or row of pockets 3 of a spring core 12 is compressed by means of a single cord 5. As indicated in FIGS. 5 and 6, stiches of the cord 5 goes through the pockets 3 and ends with a braid 6 at opposite ends of each spring string 11.

Figure 7:
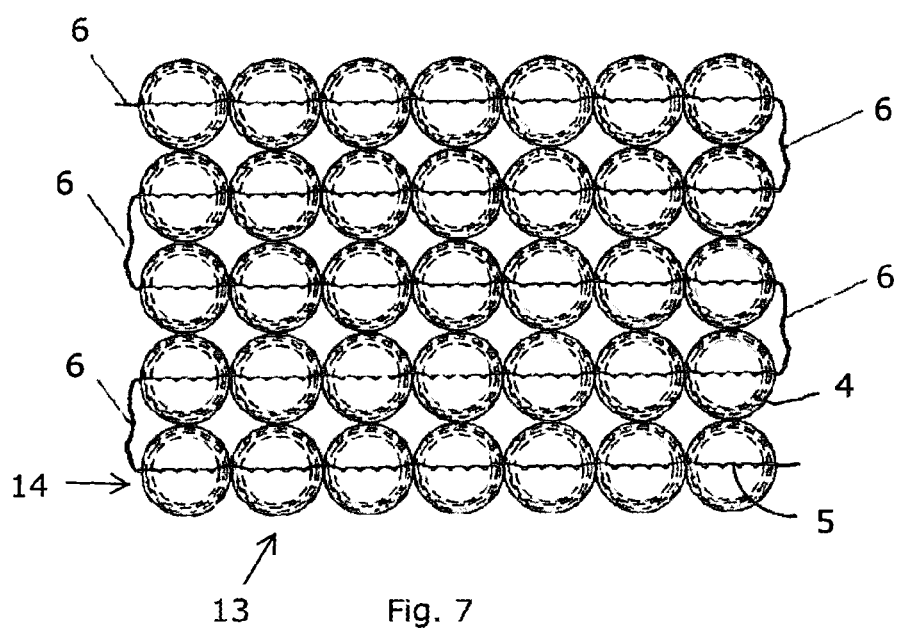
FIG. 7 is a plan view of a further embodiment of the present invention.

In the embodiment of FIG. 7 a single cord 5 is used to compress a spring core 13. The cord 5 goes through all of one spring string 14 or row of pockets 3 and then over to the next adjacent spring string 14. A braid 6 is formed of the cord 5 when going between adjacent spring strings 14. A braid 6 is also formed of the cord 5 at the end of the spring string 14 where the cord 5 is first introduced to the spring core 13, as well as at the of the spring string 14 where the cord 5 leaves the spring core 13.

Figure 8:
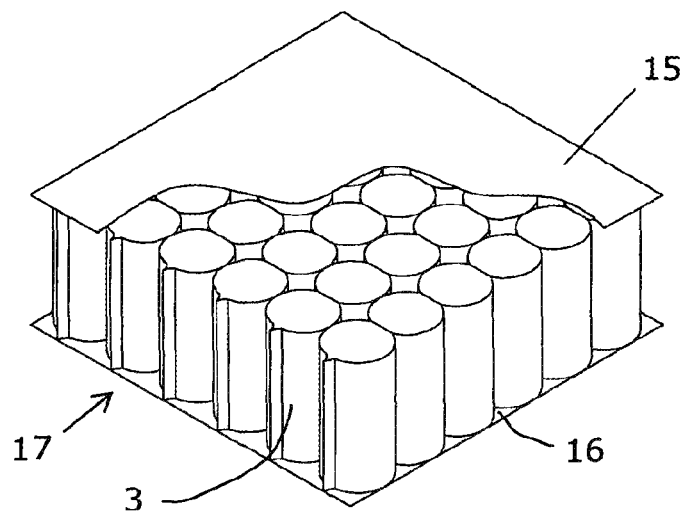
FIG. 8 is a perspective view, partly broken away, of a further embodiment of a spring core in non-compressed state.
Figure 9:
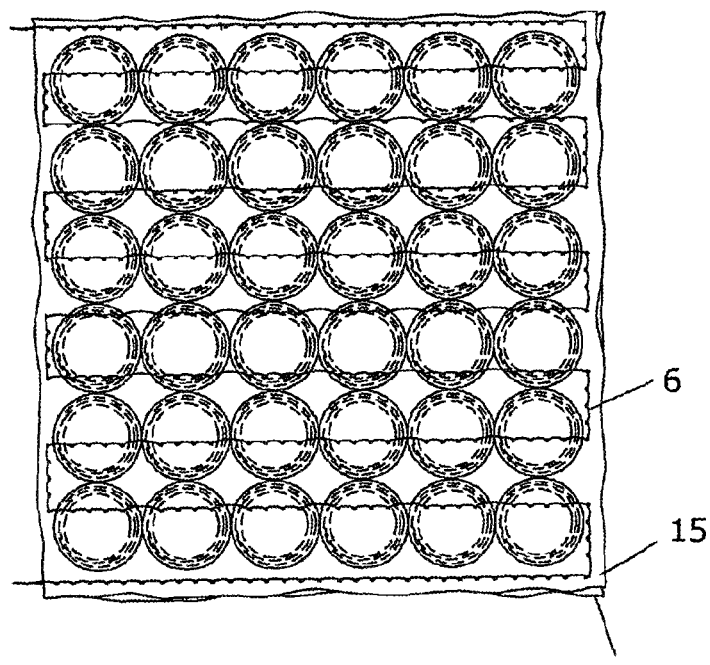
FIG. 9 is a schematic plan view of the embodiment of FIG. 8 in a compressed state.

One embodiment of a spring core 17 is shown in FIGS. 8 and 9, which spring core 17 comprises an upper deck fabric 15 and a lower deck fabric 16 placed on opposite sides of the spring core 17. In this embodiment, the cord 5 goes also through the upper and lower deck fabrics 15, 16 when compressing the spring core 17. A single cord 5 is used to compress the spring core 17.

Figure 10:
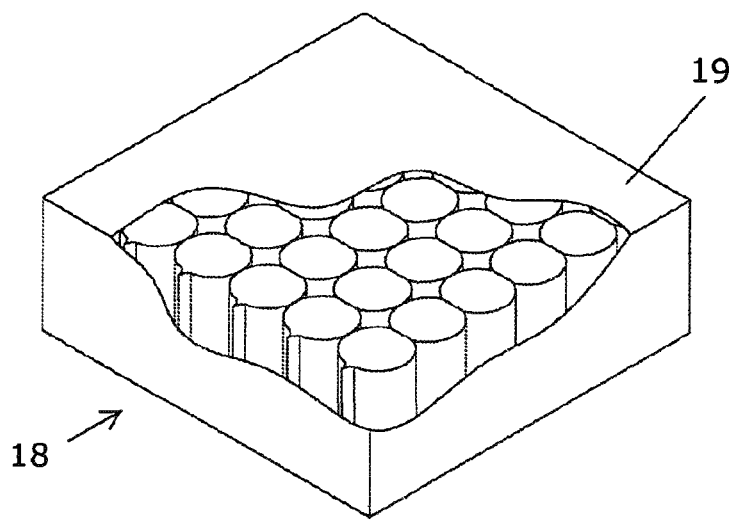
FIG. 10 is a perspective view, partly broken away, of a further embodiment of a spring core placed in a ticking or cover.
Figure 11:
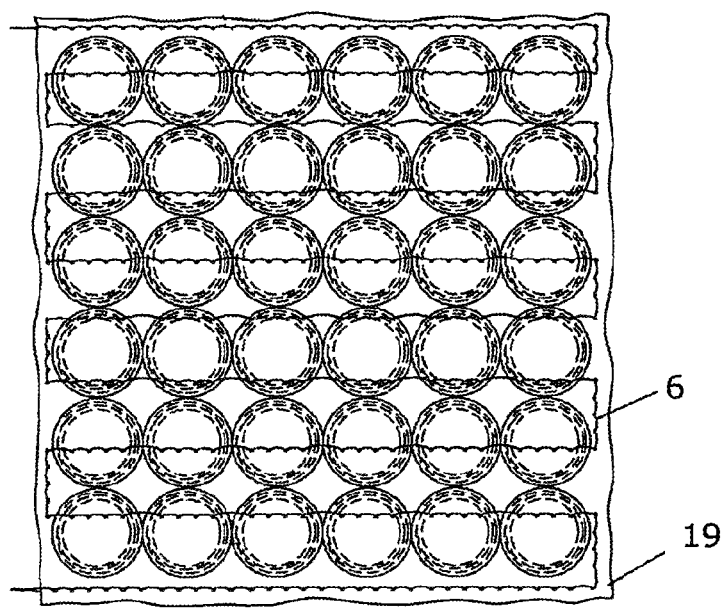
FIG. 11 is a schematic plan view of the embodiment of FIG. 10 in a compressed state.

In the embodiment of FIGS. 10 and 11, a spring core 18 is shown comprising a ticking or cover 19. The rows of pockets 3 of the spring core 18 are placed inside the ticking 19. In this embodiment, the cord 5 goes also through the ticking 19 when compressing the spring core 18. A single cord 5 is used to compress the spring core 18.

Figure 12:
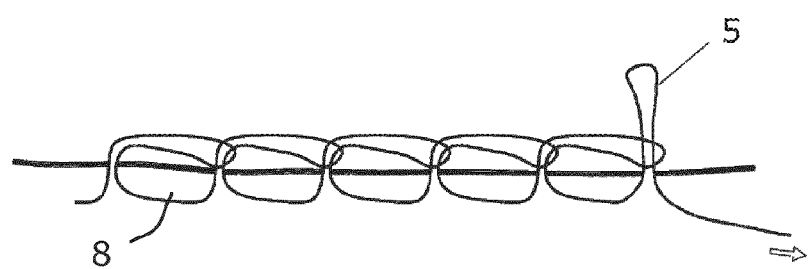
FIG. 12 is a sketch illustrating one way of using a cord for compressing a spring core according to the present invention.

In FIG. 12 one example of forming stiches with the use of one single cord 5 is shown. As described in connection with the embodiment of FIG. 3 a number of loops 8 are formed and each loop 8 goes through an adjacent loop 8. This is a type of single thread sewing. By pulling at a free end of the cord 5, as indicated by the arrow in FIG. 12, the stiches will be dissolved one after the other.

Figure 13:
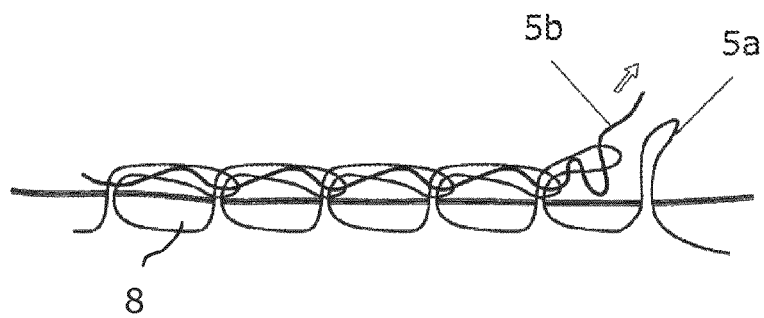
FIG. 13 is a sketch illustrating one way of using two cords for compressing a spring core according to the present invention.

In FIG. 13 one example of forming stiches with the use of two cords 5 is shown. A first cord 5a forms loops 8 in the same way as indicated in FIG. 12, where only one cord 5 is used. A second cord 5b goes through the loops 8 formed of the first cord 5a on only one side of the part, through which the loops 8 of the first cord 5a goes. This is a type of double thread sewing. By pulling at a free end of the second cord 5b, as indicated by the arrow, said second cord 5b is first removed. When the second cord 5b has been removed, the stiches may be dissolved by pulling the remaining first cord 5a.

In one further embodiment, the springs of the spring core are conical and compressed in such a way that an upper turn of each spring passes a lowest turn of the spring. A cord, such as a steel wire is then inserted through the non-woven material and in between the upper and lowermost turns of the compressed springs. Thereby the springs will be locked in a compressed state. To return the spring core to a non-compressed state the cord is drawn out.

A person skilled in the art realizes that the different embodiments may be combined in many different ways.

The invention claimed is:

1. A spring core, comprising springs placed inside pockets, which pockets are placed in a number of rows, which rows of pockets are placed side by side, wherein the spring core is held in a compressed state by means of at least one cord passing through the pockets in a form of a number of interconnected loops, wherein to form an interconnected loop, the at least one cord goes up through an opening in one of the pockets, goes through a previously formed interconnected loop and back down through the same opening.

2. The spring core of claim 1, wherein the at least one cord passes through holes in the pockets in such a way that the at least one cord forms the number of interconnected loops on at least one side of each row of pockets.

3. The spring core of claim 2, wherein the interconnected loops are formed by means of chain stitches.

4. The spring core of claim 3, wherein the at least one cord is formed into a braid at opposite outer ends of each row of pockets.

5. The spring core of claim 4, wherein the at least one cord forming the interconnected loops are held in tension between the braids.

6. The spring core of claim 1, wherein the springs are conical and compressed in such a way that an upper turn of each spring passes an associated lowest turn of the spring.

7. The spring core of claim 6, wherein the cord is arranged in between the upper and lowermost turns of the compressed springs.

8. The spring core of claim 7, wherein the cord is a steel wire.

9. The spring core of claim 1, wherein the spring core comprises deck fabrics placed on opposite sides of the spring core.

10. The spring core of claim 1, wherein the spring core comprises a ticking and wherein the rows of pockets of the spring core are placed inside the ticking.

11. The spring core 1, wherein the at least one cord (5) is formed in such a way that responsive to pulling at a free end of the at least one cord, the springs inside the pockets of the rows of pockets return to a non-compressed state.

12. The spring core of claim 1, wherein the spring core is held in the compressed state by means of one single cord.

13. The spring core of claim 1, wherein one cord is arranged for each row of pockets of the spring core.

14. A method of compressing a spring core of a pocket spring mattress, which spring core comprises springs placed inside pockets, which pockets are placed in rows side by side, wherein the springs inside the pockets are compressed, and wherein the method comprises keeping the springs inside the pockets in a compressed state by means of at least one cord passing through the pockets in a form of a number of interconnected loops, wherein to form an interconnected loop, the at least one cord goes up through an opening in one of the pockets, goes through a previously formed interconnected loop and back down through the same opening.

15. The method of claim 14, wherein the springs are allowed to rebound by pulling out the at least one cord, which at least one cord is pulled out by pulling at a free end of the at least one cord.

16. The method of claim 14, wherein the at least one cord is applied in form of single-thread sewing.

17. The method of claim 14, wherein at least two cords are applied in form of double-thread sewing.

18. The method of claim 14, wherein the springs are compressed in such a way that an upper turn of each spring passes a lowermost turn of the spring and wherein the at least one cord is inserted through the pockets and between the upper turn and the lowermost turn of each spring to keep the spring core in a compressed state.

19. The method of claim 18, wherein the at least one cord is a steel wire.

* * * * *